(12) United States Patent
Kim

(10) Patent No.: US 11,130,515 B2
(45) Date of Patent: Sep. 28, 2021

(54) COVER ASSEMBLY, MOTOR AND ELECTRIC STEERING DEVICE INCLUDING SAME

(71) Applicant: LG INNOTEK CO., LTD., Seoul (KR)

(72) Inventor: Tae Ho Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 292 days.

(21) Appl. No.: 16/461,681

(22) PCT Filed: Nov. 9, 2017

(86) PCT No.: PCT/KR2017/012663
§ 371 (c)(1),
(2) Date: May 16, 2019

(87) PCT Pub. No.: WO2018/101638
PCT Pub. Date: Jun. 7, 2018

(65) Prior Publication Data
US 2019/0351934 A1    Nov. 21, 2019

(30) Foreign Application Priority Data

Nov. 29, 2016  (KR) .................. 10-2016-0160754

(51) Int. Cl.
*H02K 3/52* (2006.01)
*H02K 5/22* (2006.01)
*B62D 5/04* (2006.01)

(52) U.S. Cl.
CPC ........... *B62D 5/0403* (2013.01); *H02K 3/522* (2013.01); *H02K 5/225* (2013.01)

(58) Field of Classification Search
CPC ......... H02K 3/522; H02K 5/225; H02K 11/00
USPC ................... 310/89, 216.114, 400, 405, 418
See application file for complete search history.

(56) References Cited

U.S. PATENT DOCUMENTS

| 6,158,983 A * | 12/2000 | Harpole ............... B62D 5/062 310/67 R |
| 2004/0000828 A1 | 1/2004 | Kobayashi et al. |
| 2006/0186747 A1 | 8/2006 | Regnard et al. |
| 2010/0201213 A1 * | 8/2010 | Kataoka ................ H02K 3/522 310/71 |
| 2015/0318756 A1 | 11/2015 | Jang et al. |

(Continued)

FOREIGN PATENT DOCUMENTS

| EP | 3 244 514 A1 | 11/2017 |
| JP | 11-18331 A | 1/1999 |

(Continued)

*Primary Examiner* — Jose A Gonzalez Quinones
(74) *Attorney, Agent, or Firm* — Birch, Stewart, Kolasch & Birch, LLP

(57) ABSTRACT

One embodiment relates to a cover assembly, a motor and an electric steering device including the same, the cover assembly comprising: a disc-shaped cover body; and a plurality of first holes formed at the cover body, wherein a grommet is disposed in the first hole, and the grommet is formed to extend and protrude from the upper surface of the cover body. Therefore, the cover assembly can stably guide the arrangement of the motor coils since the grommet is formed to be integrated with the cover body such that the first holes formed at the cover body are extended.

20 Claims, 10 Drawing Sheets

(56) References Cited

U.S. PATENT DOCUMENTS

| | | | |
|---|---|---|---|
| 2015/0333589 A1 | 11/2015 | De Filippis | |
| 2017/0254710 A1* | 9/2017 | Lee | B62D 15/021 |
| 2017/0254711 A1* | 9/2017 | Park | B62D 15/021 |
| 2018/0141583 A1* | 5/2018 | Wada | H02K 5/225 |

FOREIGN PATENT DOCUMENTS

| | | | |
|---|---|---|---|
| JP | 2006-504385 A | 2/2006 | |
| JP | 2006-129650 A | 5/2006 | |
| JP | 2008-259370 A | 10/2008 | |
| JP | 2008-278704 A | 11/2008 | |
| JP | 2009-268264 A | 11/2009 | |
| JP | 2011-160642 A | 8/2011 | |
| JP | 2013-90376 A | 5/2013 | |
| JP | 2014-39381 A | 2/2014 | |
| KR | 10-2008-0043615 A | 5/2008 | |
| KR | 10-2016-0085105 A | 7/2016 | |
| WO | WO 2014/129751 A1 | 8/2014 | |
| WO | WO-2014129751 A1 * | 8/2014 | H02K 5/1672 |

\* cited by examiner

[FIG 1]
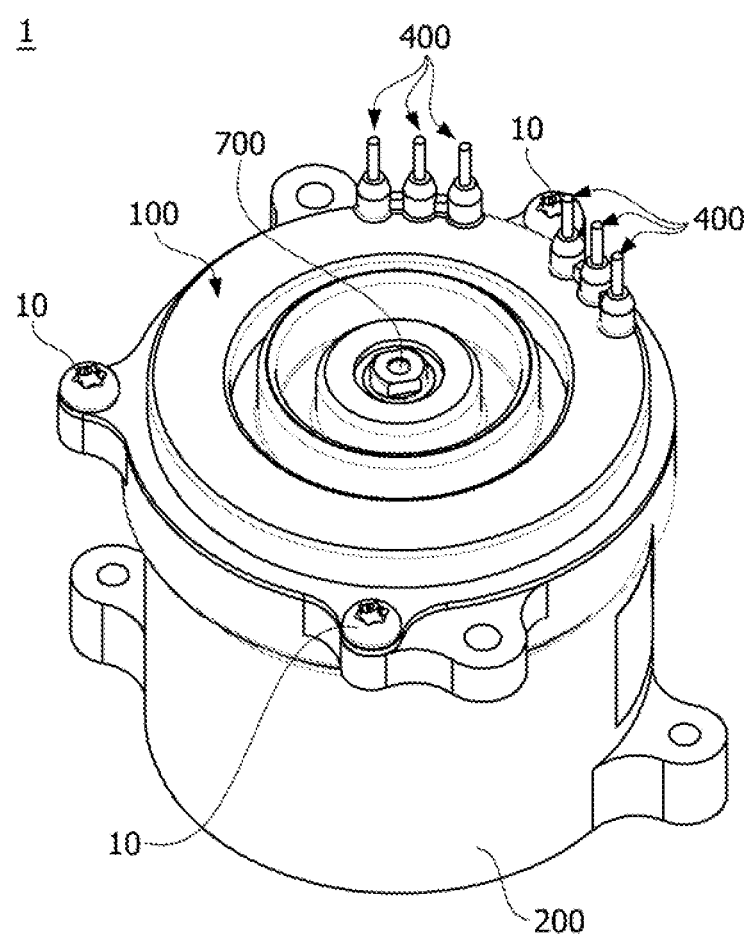

[FIG 2]
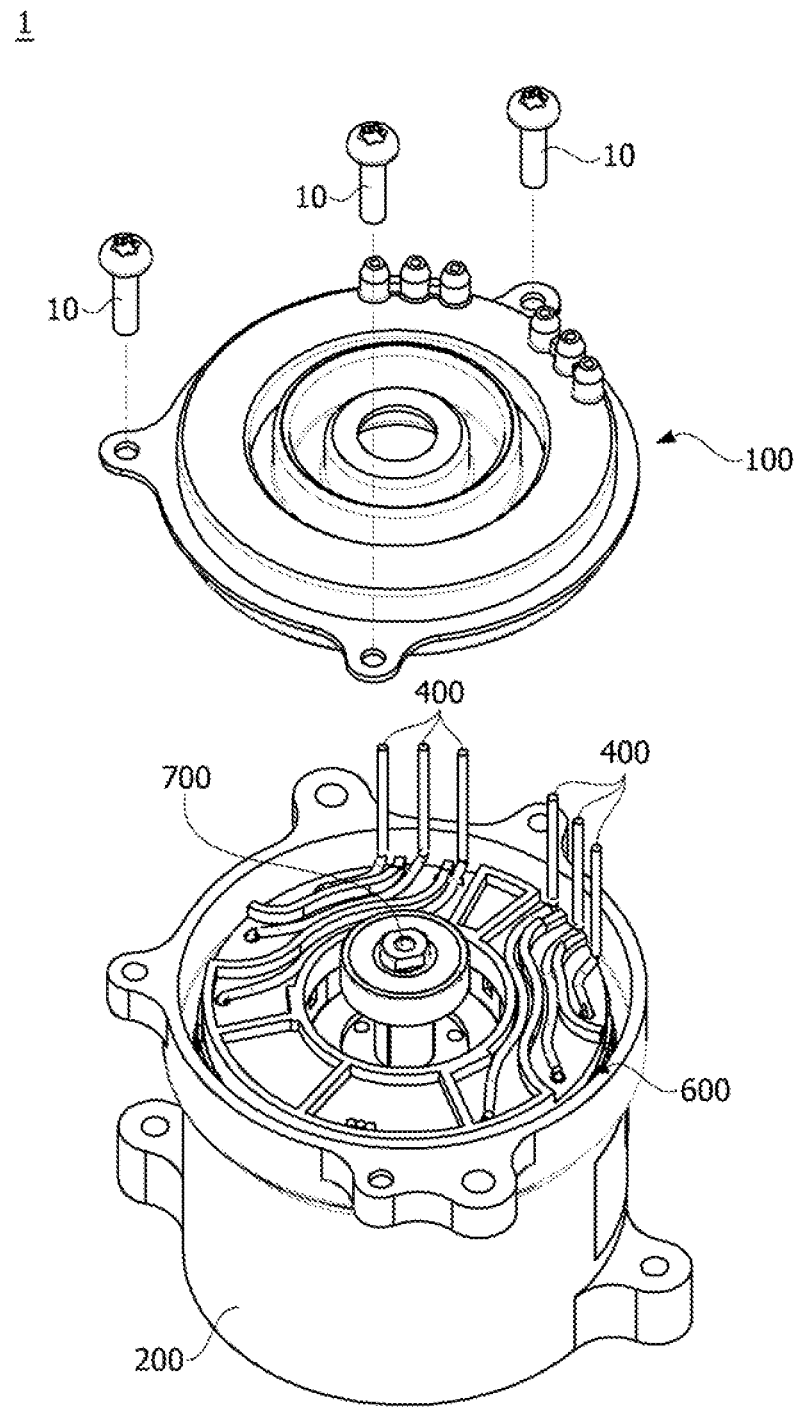

[FIG 3]
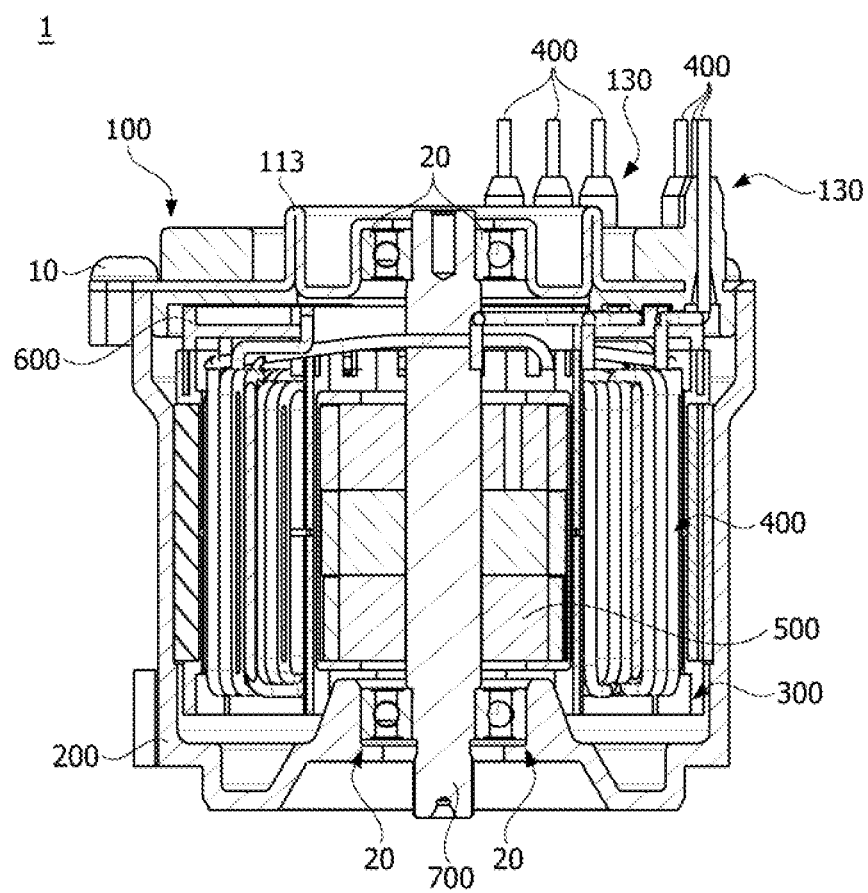

[FIG 4]
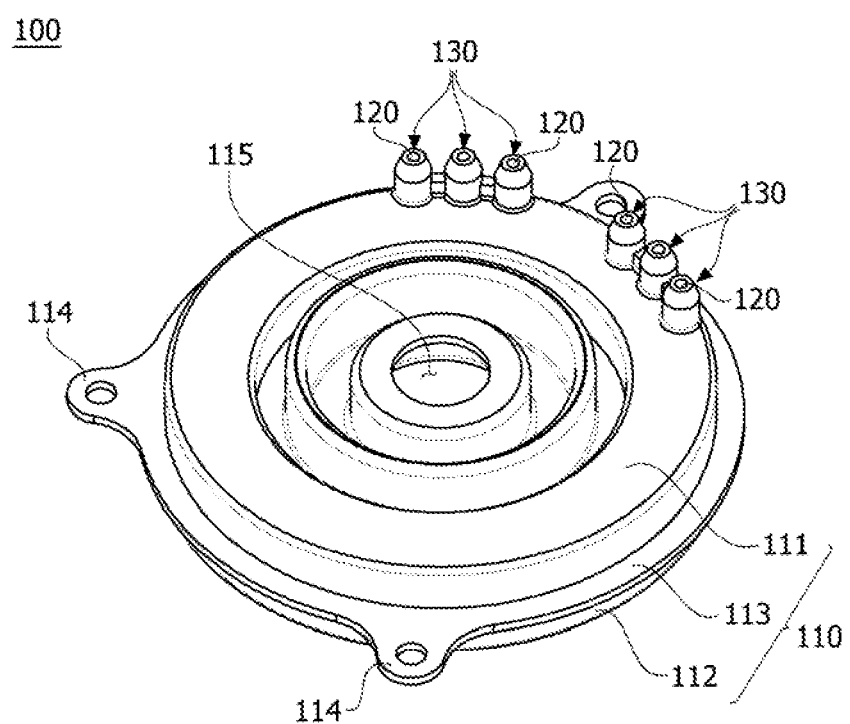

[FIG 5]
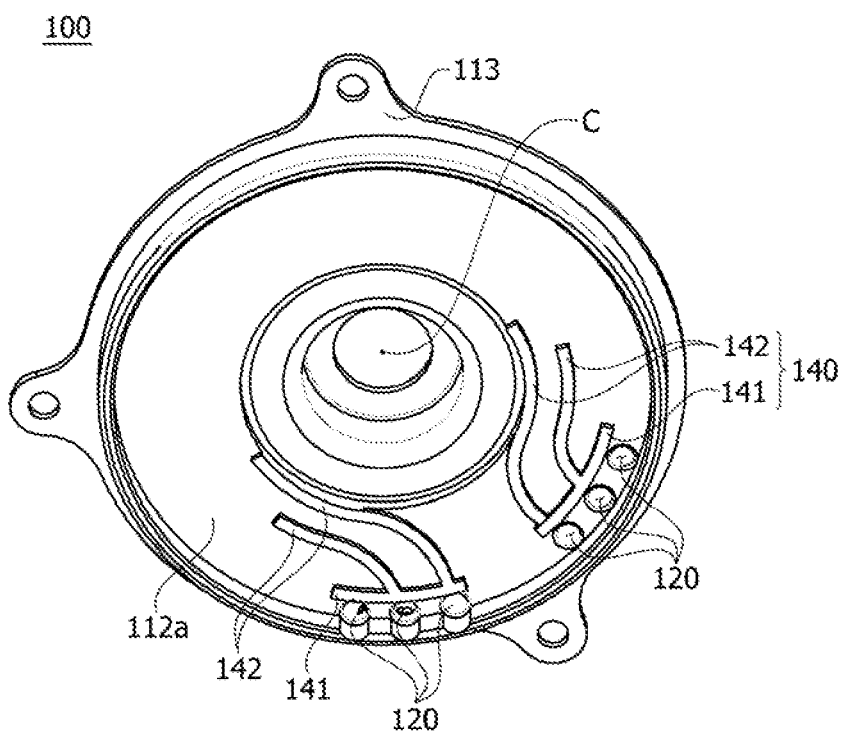

[FIG 6]
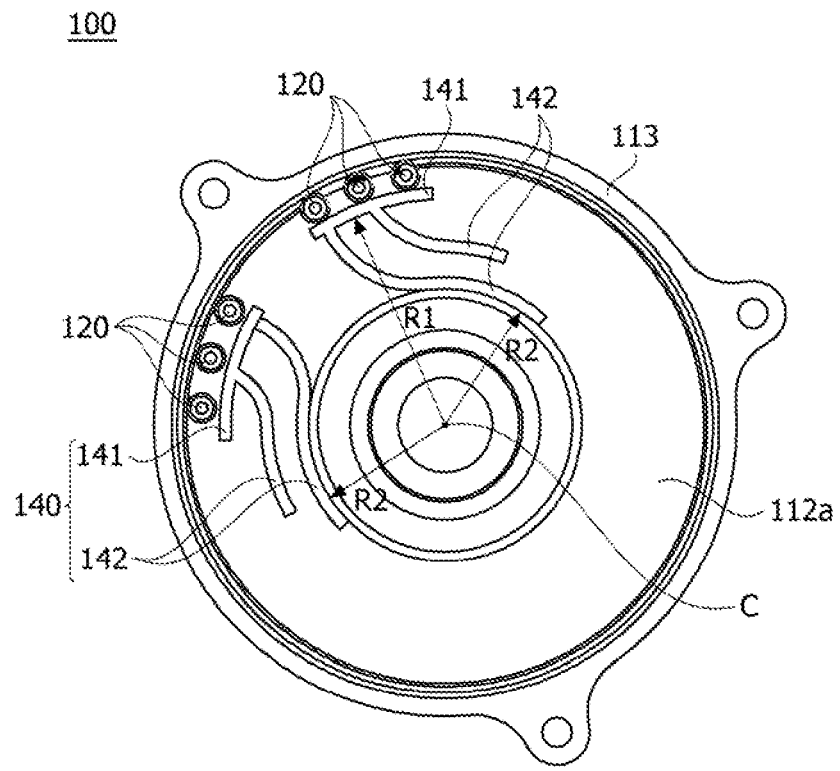
[FIG 7]
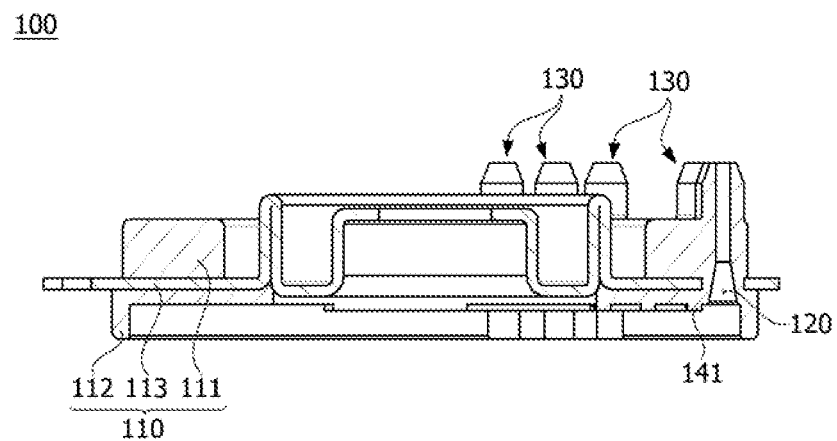

[FIG 8]
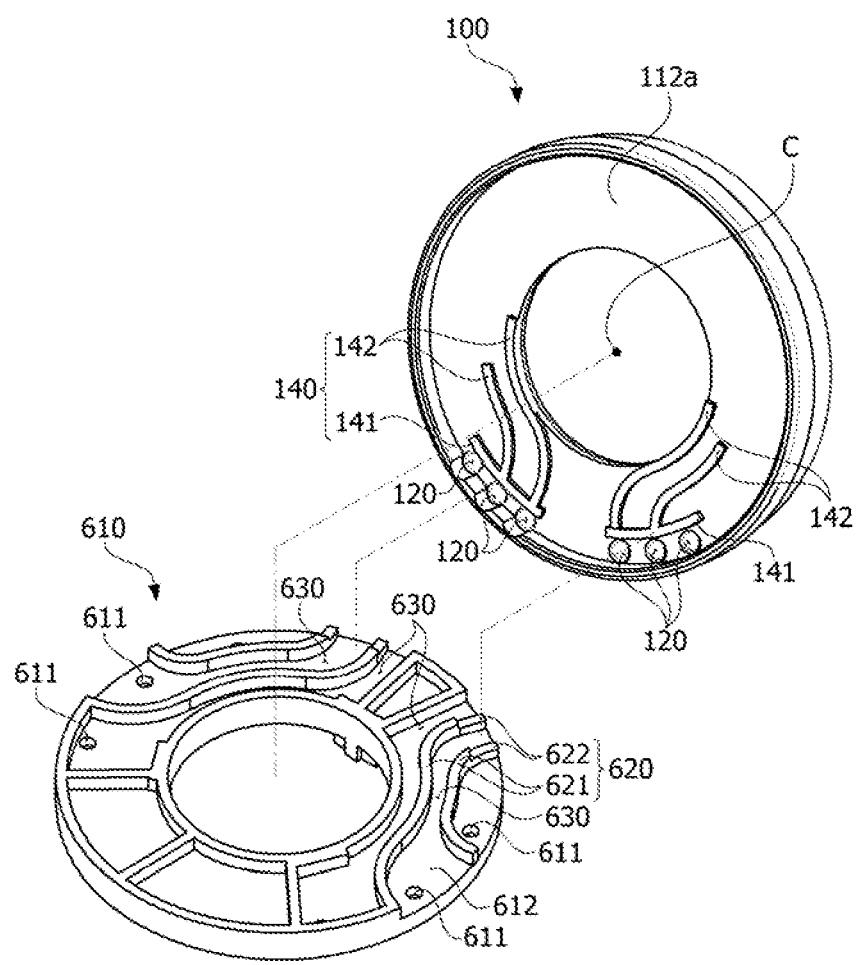

[FIG 9]
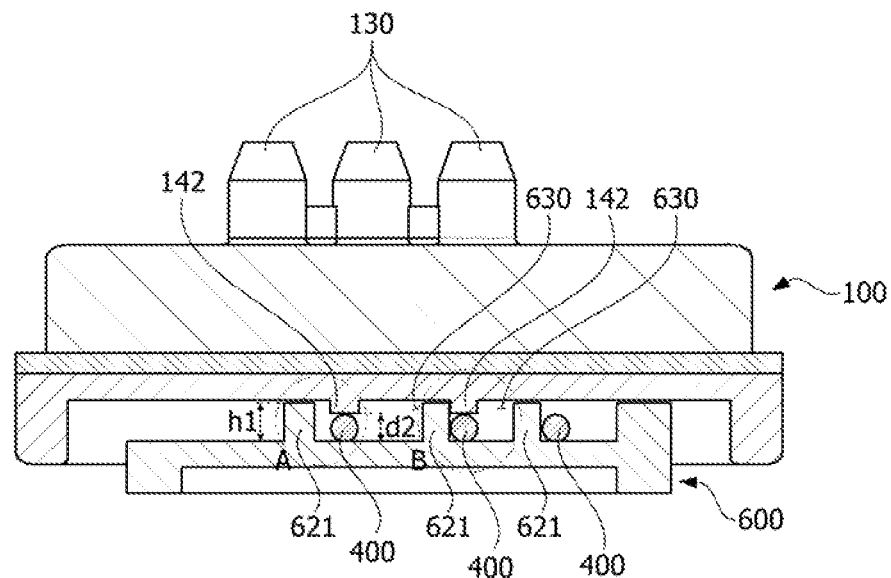
[FIG 10]
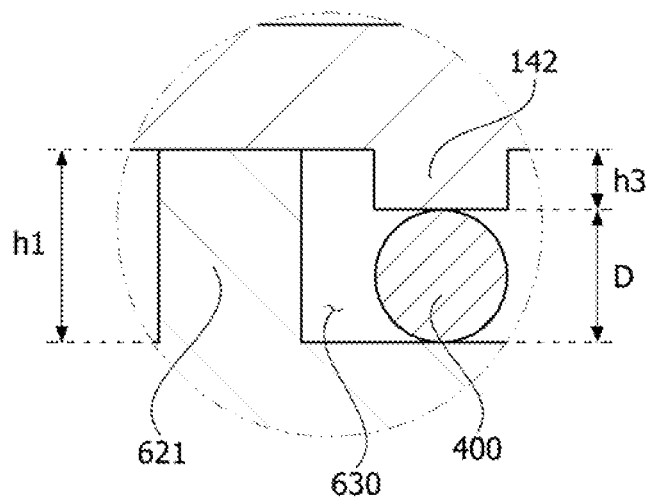

[FIG 11]
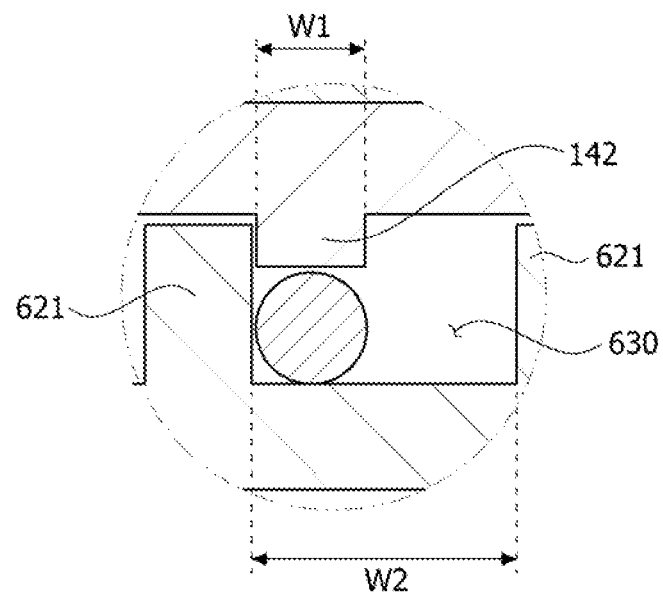
[FIG 12]
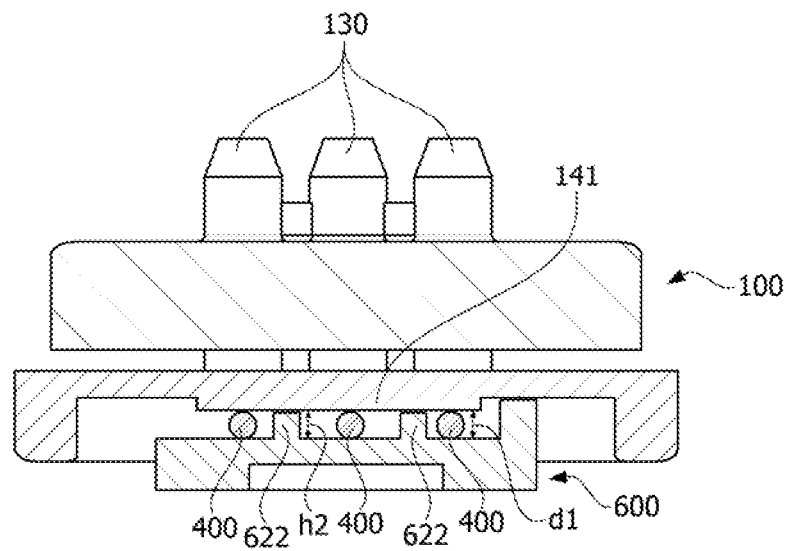

[FIG 13]
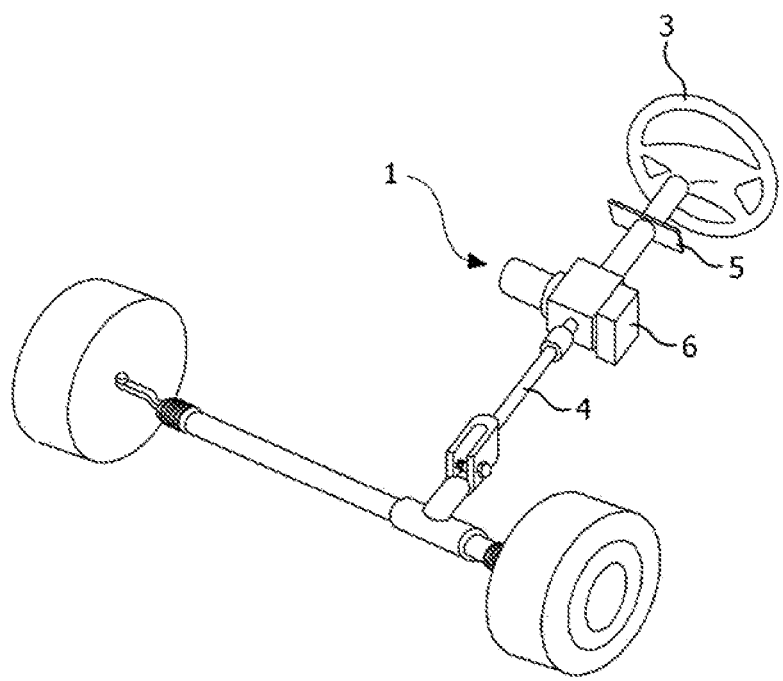

COVER ASSEMBLY, MOTOR AND ELECTRIC STEERING DEVICE INCLUDING SAME

CROSS REFERENCE TO RELATED APPLICATIONS

This application is the National Phase of PCT International Application No. PCT/KR2017/012663, filed on Nov. 9, 2017, which claims priority under 35 U.S.C. 119(a) to Patent Application No. 10-2016-0160754, filed in the Republic of Korea on Nov. 29, 2016, all of which are hereby expressly incorporated by reference into the present application.

TECHNICAL FIELD

The present invention relates to a cover assembly, a motor, and an electronic power steering system including the same.

BACKGROUND ART

A motor is an apparatus configured to convert electric energy to rotational energy using a force applied to a conductor in a magnetic field. Recently, with the expansion of uses for motors, the role of the motor has become important. Particularly, as more electric devices are used in a vehicle, demands for a motor applied to a steering system, a braking system, a machinery system, and the like are greatly increasing.

Particularly, the motor of the steering system assists the steering system with additional power to secure steering stability of a vehicle.

A system using a hydraulic pressure is conventionally used as an auxiliary steering system. However, recently, an electronic power steering (EPS) system with low power loss and high accuracy has been used as the auxiliary steering system.

In the EPS system, an electronic control unit (ECU) drives a motor to secure turning stability and rapidly provide a storing force according to travelling conditions which are detected by a vehicle speed sensor, an angle sensor, a torque sensor, and the like. Accordingly, a driver may travel safely.

Generally, the motor includes a rotating shaft which is rotatably formed, a rotor coupled to the rotating shaft, and a stator fixed in a housing, and the stator is installed to be spaced a gap from a circumference of the rotor. In addition, coils, which generate a rotating magnetic field, are wound around the stator to induce an electrical interaction with the rotor so that the rotor rotates. As the rotor rotates, the rotating shaft rotates to generate a driving force.

In addition, a busbar electrically connected to the coils is disposed on an upper end of the stator. The busbar includes a busbar housing having a substantially ring shape and a busbar terminal coupled to the busbar housing and connected to the coil. Generally, the busbar terminal is formed by performing a pressing process on a metal plate such as a copper plate.

In this case, the busbar terminal may include a plurality of terminals directly connected to the coils. A part of each of the terminals may be bent due to a spatial limitation or a position of a connecting end of the coil.

In addition, the rotating shaft may be rotatably supported by a bearing in the housing. Here, the bearing may be disposed in the housing to be supported or may be press-fitted and installed in the busbar housing.

However, in the case of the above-described motor, since components have to be assembled in the housing through various assembly processes, there is a problem of increasing manufacturing costs.

In addition, in a case in which the busbar terminal is used, costs are further increased.

Accordingly, a router may be substituted for the busbar terminal and used, but in the case of the router, there is a problem of generating movement of the coils.

Meanwhile, since the coils may be exposed to the outside of the motor to be connected to a power terminal, separate grommets may be disposed in the motor so as to protect the coils. Particularly, in a case in which the coils are wound around the stator using a duel winding method, six grommets are disposed in the motor.

Here, since the grommets are fitted to end portions of the coils exposed to the outside, in a case in which positions of the end portions of the coils are unclear, a problem with assembly of the grommets may occur.

In addition, since a fitting process of the grommet is added, the number of processes is increased, and thus there is a problem of increasing manufacturing costs.

DISCLOSURE

Technical Problem

The present invention is directed to providing a cover assembly including a grommet integrally formed with a cover body to extend a hole in which a coil is disposed, a motor, and an electronic power steering system including the same.

In addition, the present invention is directed to providing a cover assembly configured to prevent movement of a coil by forming a protrusion on a cover body, a motor, and an electronic power steering system including the same.

Objectives that should be solved according to the embodiments are not limited to the above described objectives, and other objectives which are not described above will be clearly understood by those skilled in the art from the following specification.

Technical Solution

One aspect of the present invention provides a cover assembly including a cover body having a disc shape and a plurality of first holes formed in the cover body, wherein a grommet is disposed on the first hole, and the grommet is formed to protrude from an upper surface of the cover body.

The cover body may include: an upper cover; a lower cover; and a bearing plate disposed between the upper cover and the lower cover, wherein the grommet may be disposed on the upper cover.

The upper cover, the lower cover, and the grommet may be formed on the bearing plate of the cover body using an insert injection method.

The cover body may further include a first protrusion and a second protrusion which are formed to protrude from a lower surface of the lower cover, and the first protrusion may be formed to have a predetermined curvature with respect to a center (C) of the cover body.

Another aspect of the present invention provides a cover assembly including a cover body having a disc shape and a plurality of first holes formed in the cover body, wherein the cover body includes an upper cover, a lower cover, a bearing plate disposed between the upper cover and the lower cover, and a first protrusion and a second protrusion which are formed to protrude from a lower surface of the lower cover, wherein the first protrusion is formed to have a predetermined curvature with respect to a center (C) of the cover body.

At least two second protrusions may be formed to extend from one side of the first protrusion, and the second protrusions may be disposed to be spaced apart from each other on the lower surface of the lower cover.

One region of any one of the second protrusions may be formed to have a predetermined curvature with respect to the center (C) of the cover body.

The curvature of the second protrusion may be greater than the curvature of the first protrusion.

Still another aspect of the present invention provides a motor including: a rotating shaft; a rotor coupled to the rotating shaft; a stator disposed outside the rotor; a coil wound around the stator; a router disposed on the stator; a housing which accommodates the rotor, the stator, and the router and in which an opening is formed in one side of the housing; and a cover assembly which covers the opening, wherein the cover assembly includes a cover body having a disc shape, and a plurality of first holes formed in the cover body, wherein a grommet is disposed on the first hole, and the grommet is formed to extend and protrude from an upper surface of the cover body.

The cover body may include: an upper cover; a lower cover; and a bearing plate disposed between the upper cover and the lower cover, wherein the grommet may be disposed on the upper cover.

The cover body may further include a first protrusion and a second protrusion which are formed to protrude from a lower surface of a lower cover, and the first protrusion may be formed to have a predetermined curvature with respect to a center (C) of the cover body.

Yet another aspect of the present invention provides a motor including: a rotating shaft; a rotor coupled to the rotating shaft; a stator disposed outside the rotor; a coil wound around the stator; a router disposed on the stator; a housing which accommodates the rotor, the stator, and the router and in which an opening is formed in one side of the housing; and a cover assembly which covers the opening, wherein the cover assembly includes a cover body having a disc shape and a plurality of first holes formed in the cover body, wherein the cover body includes an upper cover, a lower cover, a bearing plate disposed between the upper cover and the lower cover, and a first protrusion and a second protrusion formed to protrude from a lower surface of the lower cover, wherein the first protrusion is formed to have a predetermined curvature with respect to a center (C) of the cover body.

The router may include a router body having a disc shape and a plurality of guides which are disposed on the router body and guide the coil.

A channel may be formed between the guides disposed to be spaced apart from each other.

The guides may include a first guide and a second guide disposed at one side of the first guide, and a height (h2) of the second guide may be lower than a height (h1) of the first guide.

The first protrusion may be disposed above the second guide

The second protrusion may be disposed in the channel.

At least two second protrusions may be formed to extend from one side of the first protrusion, and the second protrusions may be disposed to be spaced apart from each other on the lower surface of the lower cover.

One region of any one of the second protrusions may be formed to have a predetermined curvature with respect to the center (c) of the cover body.

The curvature of the second protrusion may be greater than the curvature of the first protrusion.

Yet another aspect of the present invention provides a motor including: a rotating shaft; a rotor coupled to the rotating shaft; a stator disposed outside the rotor; a coil wound around the stator; a router which is disposed on the stator and includes a plurality of guides; a housing which accommodates the rotor, the stator, and the router and in which an opening is formed in one side of the housing; and a cover assembly which covers the opening, wherein the cover assembly includes a protrusion formed to protrude from a lower surface thereof, and the protrusion supports the coil disposed between the guides.

The protrusion may include a first protrusion and second protrusions, the first protrusion may be formed to have a predetermined curvature with respect to a center (C) of the cover body, and the plurality of second protrusions formed to extend from one side of the first protrusion may be disposed to be spaced apart from each other.

The guides may include first guides and second guides disposed at one sides of the first guide, and a height (h2) of the second guides may be lower than a height (h1) of the first guide.

The second protrusions may be disposed between the first guides.

The sum of a diameter (D) of the coil and a height (h3) of the second protrusion may be equal to a height (h1) of the first guide.

A width between the first guides may be greater than a width of the second protrusion.

The cover assembly may include a cover body having a disc shape and a plurality of first holes formed in the cover body, wherein a grommet may be disposed on the first hole, and the grommet may be formed to extend and protrude from an upper surface of the cover body.

The cover body may include: an upper cover; a lower cover; and a bearing plate disposed between the upper cover and the lower cover, wherein the grommet may be disposed on the upper cover, and the upper cover, the lower cover, and the grommet may be formed on the bearing plate of the cover body using an insert injection method.

Yet another aspect of the present invention provides an electronic power steering system including a steering shaft and a motor connected to the steering shaft, wherein the motor includes the above-described motor.

Advantageous Effects

In a cover assembly, a motor, and an electronic power steering system including the same according to an embodiment, since a grommet is integrally formed with a cover body in the cover assembly to extend a first hole formed in the cover body, coils can be stably guided to be arranged.

In addition, since the grommet is integrally formed with an upper cover, a conventional process of assembling a grommet can be omitted. Accordingly, since an assembly process is simply performed, manufacturing costs can be reduced.

That is, since the grommet is integrally formed with the upper cover of the cover assembly using an insert method, a structure and an assembly process can be simplified.

In addition, the movement of the coil can be prevented using a first protrusion and a second protrusion formed to protrude from a lower surface of the lower cover.

A variety of useful advantages and effects are not limited to the above-described contents and will be more easily understood when a specific embodiment of the present invention is described.

DESCRIPTION OF DRAWINGS

FIG. 1 is a perspective view illustrating a motor according to an embodiment.

FIG. 2 is a view showing coupling of a cover assembly and a housing of the motor according to the embodiment.

FIG. 3 is a cross-sectional view illustrating the motor according to the embodiment.

FIG. 4 is a perspective view illustrating the cover assembly according to the embodiment.

FIG. 5 is a bottom perspective view illustrating the cover assembly according to the embodiment.

FIG. 6 is a bottom view illustrating the cover assembly according to the embodiment.

FIG. 7 is a cross-sectional view illustrating the cover assembly according to the embodiment.

FIG. 8 is a view showing an arrangement of the cover assembly and a router according to the embodiment.

FIG. 9 is a view illustrating coils prevented from moving by second protrusions of the cover assembly according to the embodiment.

FIG. 10 is an enlarged view illustrating a region A of FIG. 9.

FIG. 11 is an enlarged view illustrating a region B of FIG. 9.

FIG. 12 is a view illustrating the coils prevented from moving by a first protrusion of the cover assembly according to the embodiment.

FIG. 13 is a view illustrating an electronic power steering system according to an embodiment.

MODES OF THE INVENTION

Since the invention allows for various changes and numerous embodiments, specific embodiments will be illustrated in the accompanying drawings and described in detail in the written description. However, this is not intended to limit the present invention to specific modes of practice, and it is to be appreciated that all changes, equivalents, and substitutes that do not depart from the spirit and technical scope of the present invention are encompassed in the present invention.

It will be understood that, although the terms "first," "second," etc. may be used herein to describe various elements, these elements should not be limited to these terms. These terms are only used to distinguish one element from another. For example, a first element could be termed a second element, and a second element could similarly be termed a first element without departing from the scope of the present invention. As used herein, the term "and/or" includes combinations or any one of a plurality of associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements.

In the description of the embodiments, when an element is referred to as being "on or under" another element, the term "on or under" refers to either a direct connection between two elements or an indirect connection between two elements having one or more elements formed therebetween. In addition, when the term "on or under" is used, it may refer to a downward direction as well as an upward direction with respect to an element.

The terminology used herein is for the purpose of describing particular embodiments only and is not intended to be limiting to the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, components, and/or groups thereof but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Hereinafter, example embodiments of the invention will be described below in more detail with reference to the accompanying drawings, components that are the same or correspond to each other are rendered with the same reference numeral regardless of the figure number, and redundant descriptions thereof will be omitted.

FIG. 1 is a perspective view illustrating a motor according to an embodiment, FIG. 2 is a view showing coupling of a cover assembly and a housing of the motor according to the embodiment, and FIG. 3 is a cross-sectional view illustrating the motor according to the embodiment.

Referring to FIGS. 1 to 3, a motor 1 according to the embodiment may include a cover assembly 100, a housing 200, a stator 300, coils 400, a rotor 500, a router 600, and a rotating shaft 700 according to the embodiment. Here, the router 600 may be disposed on the stator 300 to guide each of the coils 400 to be arranged. In addition, a magnet wire may be used instead of the coil 400.

Referring to FIGS. 2 and 3, the cover assembly 100 may be disposed to cover an open upper portion of the housing 200. In addition, the cover assembly 100 may be coupled to the housing 200 by fixing members 10.

Accordingly, the cover assembly 100 and the housing 200 may form an exterior of the motor 1. Here, the housing 200 may be formed in a cylindrical shape having an opening formed in the upper portion thereof.

Accordingly, due to the cover assembly 100 and the housing 200 being coupled, an accommodation space may be formed therein. In addition, as illustrated in FIG. 3, the stator 300, the coils 400, the rotor 500, the router 600, the rotating shaft 700, and the like may be disposed in the accommodation space.

FIG. 4 is a perspective view illustrating the cover assembly according to the embodiment, FIG. 5 is a bottom perspective view illustrating the cover assembly according to the embodiment, FIG. 6 is a bottom view illustrating the cover assembly according to the embodiment, and FIG. 7 is a cross-sectional view illustrating the cover assembly according to the embodiment.

Referring to FIGS. 4 to 7, the cover assembly 100 according to the embodiment may include a cover body 110 formed in a disc shape and a plurality of through holes 120 and grommets 130 which are formed in the cover body 110. In addition, the cover assembly 100 may include protrusions 140 formed on a lower surface of the cover body 110. Here, since the through holes 120 may be referred to as first holes 120, hereinafter, the through holes 120 are described as the first holes 120.

The cover body 110 may be disposed to cover an open upper portion of the housing 200. In addition, the cover body 110 may be coupled to the housing 200 by the fixing members 10.

The cover body 110 may include an upper cover 111, a lower cover 112, and a bearing plate 113. Here, the bearing plate 113 may be formed of a metal material.

The upper cover 111, the lower cover 112, and the grommets 130 may be formed on the bearing plate 113 of the cover body 110 using an insert injection method. Accordingly, the grommets 130 may be integrally formed with the upper cover 111. In addition, the upper cover 111, the lower cover 112, and the grommets 130 may be formed of a synthetic resin material such as mold.

Accordingly, since the grommets 130 are integrally formed with the upper cover 111, a conventional assembly process of assembling grommets may be omitted.

The bearing plate 113 may be disposed between the upper cover 111 and the lower cover 112. In addition, as illustrated in FIG. 3, the bearing plate 113 may support bearings 20.

Meanwhile, coupling portions 114 are formed to protrude from an outer circumferential surface of the bearing plate 113 in a radial direction. Accordingly, as illustrated in FIG. 2, end portions of the fixing members 10 may pass through the coupling portions 114 and be coupled to one side of the housing 200.

Each of the first holes 120 may be formed to pass through the cover body 110. Accordingly, as illustrated in FIG. 3, one region of the coil 400 may be disposed in the first hole 120. Here, the first hole 120 may be formed in the same direction as the rotating shaft 700.

The first hole 120 is extended by the grommets 130. Accordingly, the coil 400 disposed in the first hole 120 may be guided by the grommet 130. In addition, the coil 400 may be protected by the grommet 130.

The protrusions 140 formed to protrude may further be disposed on a lower surface 112a of the lower cover 112. Here, the protrusions 140 may include first protrusions 141 and second protrusions 142.

The first protrusions 141 and the second protrusions 142 may restrict movement of the coils 400 disposed between the lower cover 112 and the router 600.

The first protrusions 141 may be formed downward from the lower surface 112a of the lower cover 112. Here, the first protrusions 141 may be formed to have a predetermined curvature 1/R1 with respect to a center C of the cover body 110. For example, as illustrated in FIG. 6, the first protrusions 141 may be formed in an arc shape, and two first protrusions 141 may be disposed to be spaced apart from each other.

In addition, each of the first protrusions 141 may be disposed adjacent to the first hole 120. Accordingly, when one side of the coil 400 is inserted into the first hole 120, the first protrusion 141 is in contact with one region of the coil 400. Accordingly, since the first protrusion 141 is formed to protrude from the lower surface 112a, the first protrusion 141 restricts a vertical distance d1 in which the coil 400 may move in a vertical direction.

The second protrusion 142 may be formed downward from the lower surface 112a of the lower cover 112.

As illustrated in FIGS. 5 and 6, at least two second protrusions 142 may be formed to extend from one side of the first protrusion. Here, the second protrusions 142 may be disposed to be spaced from each other on the lower surface 112a of the lower cover 112.

The second protrusion 142 may be formed in a curved shape in which one region of the second protrusion 142 is curved.

As illustrated in FIG. 6, one region of any one of the second protrusions 142 may be formed to have a predetermined curvature 1/R2 with respect to the center C of the cover body 110.

Here, the curvature 1/R2 of the second protrusion 142 may be greater than the curvature 1/R1 of the first protrusion 141. That is, the second protrusion 142 may be disposed further inward than the first protrusion 141 with respect to the center C of the cover body 110. Here, the term 'inward' may refer to a direction toward the center C in the radial direction.

Meanwhile, an arrangement hole 115 may be disposed at the center C of the cover body 110 such that the rotating shaft 700 is disposed therein.

The stator 300 may be supported by an inner circumferential surface of the housing 200.

The coil 400 configured to generate a rotating magnetic field may be wound around the stator 300. Here, the stator 300 may be formed as a single core or a plurality of separate cores which are coupled.

The stator 300 is disposed outside the rotor 500. That is, the rotor 500 may be disposed inside the stator 300.

The stator 300 may include a stator core. The stator core may be formed in a form in which a plurality of plates having a thin steel plate shape are stacked on each other but is not necessarily limited thereto. For example, the stator core may also be formed as a single part.

A plurality of teeth may be formed to protrude from an outer circumferential surface of the stator core. The teeth may be disposed to protrude in a radial direction with respect to a center of the stator core. Accordingly, slots may be formed between the teeth. Here, the slots may be disposed to face magnets. In addition, the coil 400 is wound in each of the slots. Here, an insulator (not shown) may be installed in the slot. The insulator insulates the slot from the coil 400.

Accordingly, when a current is supplied to the coil 400, an electric interaction with each of the magnets is induced so that rotor 500 may rotate. In the case in which the rotor 500 rotates, the rotating shaft 700 also rotates together therewith. Here, the rotating shaft 700 may be supported by the bearings 20.

The rotor 500 may be disposed inside the stator 300. In addition, the rotating shaft 700 may be coupled to a central portion of the rotor 500.

The rotor 500 may be formed by the magnets being coupled to a rotor core. For example, the rotor 500 may be formed in a form in which the magnets are disposed on an outer circumferential surface of the rotor core.

Accordingly, the magnets and the coils 400 wound around the stator 300 generate a rotating magnetic field. The magnets may be disposed such that N and S poles thereof are alternately positioned in a circumferential direction with respect to the rotating shaft 700.

Accordingly, the rotor 500 rotates due to an electric interaction between the coils 400 and the magnets, and when the rotor 500 rotates, the rotating shaft 700 rotates to generate a driving force.

Meanwhile, the rotor core of the rotor 500 may be manufactured to have a form in which a plurality of separate cores are coupled or a single core is formed as a single cylinder.

The router 600 may be disposed on the stator 300 and may guide the coils 400 to be arranged. Here, the router 600 may be formed of an insulating material such as a synthetic resin.

FIG. 8 is a view showing an arrangement of the cover assembly and the router according to the embodiment.

Referring to FIG. 8, the router 600 may include a router body 610 having a disc shape and a plurality of guides 620 which are disposed on the router body 610 and which guide the coils 400 to be arranged. Here, the router body 610 may be integrally formed with the guides 620. In addition, the guides 620 may be formed in a curved shape in which one regions of the guides 620 are curved. Accordingly, the guides 620 of the router 600 may arrange the coils 400. That is, one regions of the coils 400 may be disposed between the guides 620 of the router 600.

The router body 610 may be formed in a disc shape, and second holes 611 may be formed in one side of the router body 610. Accordingly, parts of the coils 400 wound around the stator 300 may be disposed on the router body 610 through the second holes 611.

The guides 620 may be formed to protrude from an upper surface 612 of the router body 610. In addition, the plurality of guides 620 may be disposed to be spaced apart from each other.

Accordingly, channels 630 in which the coils 400 are disposed may be formed between the guides 620. Accordingly, the coils 400 which pass through the second holes 611 may be disposed and arranged along the channels 630.

Each of the guides 620 may include first guides 621 and second guides 622 of which heights are different from each other. Here, each of the first guides 621 may be formed to protrude to a predetermined height h1, and each of the second guides 622 may be formed to protrude to a predetermined height h2. Here, the height h2 of the second guide 622 may be lower than the height h1 of the first guide 621.

As illustrated in FIG. 8, the first guide 621 may be formed to protrude from the upper surface 612 of the router body 610 and formed in a curved shape in which one region of the first guide 621 is curved.

FIG. 9 is a view illustrating the coils prevented from moving by the second protrusions of the cover assembly according to the embodiment, FIG. 10 is an enlarged view illustrating a region A of FIG. 9, and FIG. 11 is an enlarged view illustrating a region B of FIG. 9.

As illustrated in FIG. 9, the second protrusions 142 may be disposed in the channels 630 formed between the first guides 621. Here, the second protrusions 142 may be spaced apart from each other by a predetermined gap to be disposed on the upper surface 612 of the router body 610.

The second protrusion 142 may be formed in a curved shape in which one region of the second protrusion 142 is curved. Accordingly, even when a width W1 of the second protrusion 142 is less than a width W2 of the channel 630, the second protrusion 142 may restrict movement of the coil 400 disposed in the channel 630. That is, the second protrusion 142 may restrict a vertical distance d2 in which the coil 400 may move in the vertical direction.

In addition, the sum of a diameter D of the coil 400 and a height h3 of the second protrusion 142 may be equal to the height h1 of the first guide 621. Accordingly, the second protrusion 142 may support the coil 400. Here, the width W1 of the second protrusion 142 may be less than the width W2 of the channel 630, but the present invention is not necessarily limited thereto. For example, the width W1 of the second protrusion 142 may also be equal to the width W2 of the channel 630. However, since the second protrusion 142 and the first guide 621 have curved regions, the width W1 of the second protrusion 142 may be less than the width W2 of the channel 630 so that the second protrusion 142 may be easily disposed. Here, the width W2 of the channel 630 may be a width W2 between the first guides 621.

As illustrated in FIG. 8, the second guide 622 may be formed to protrude from the upper surface 612 of the router body 610.

The second guide 622 may be disposed at one side of the first guide 621. Preferably, the second guide 622 may be formed to extend from one end portion of the first guide 621. In addition, the height h2 of the second guide 622 may be lower than the height h1 of the first guide 621.

FIG. 12 is a view illustrating the coils prevented from moving by the first protrusion of the cover assembly according to the embodiment.

As illustrated in FIG. 12, the first protrusion 141 may be disposed above the second guides 622. Here, the first protrusion 141 may be disposed to be spaced apart from the upper side of the second guide 622 but is not limited thereto, and the first protrusion 141 may be disposed to be in contact with the upper side of the second guide 622.

Accordingly, when one side of the coil 400 is inserted into the first hole 120, the first protrusion 141 is in contact with one region of the coil 400. Accordingly, since the first protrusion 141 is formed to protrude, the first protrusion 141 restricts the vertical distance d1 in which the coil 400 may move in the vertical direction.

In addition, the height h2 of the second guide 622 may be equal to the diameter D of the coil 400 based on the upper surface 612. In addition, since the first protrusion 141 is disposed to be in contact with the upper side of the second guide 622, the first protrusion 141 may support the coil 400.

As illustrated in FIG. 3, the rotating shaft 700 may be rotatably disposed in the housing 200 by the bearings 20 disposed on an outer circumferential surface of the rotating shaft 700.

Meanwhile, an electronic power steering (EPS) system 2 according to an embodiment may include the motor 1.

Referring to FIG. 13, the EPS system 2 may include a motor 1, a steering wheel 3, a steering shaft 4, a steering angle sensor 5, and an electronic control unit (ECU) 6.

The steering wheel 3 generally refers to a handle, and a driver rotates the steering wheel 3 to turn a direction of a vehicle. The steering wheel 3 may be disposed to be connected to the steering shaft 4, and when the driver rotates the steering wheel 3, the steering shaft 4 is rotated in the same direction as the steering wheel 3 in conjunction with the rotation of the steering wheel 3.

The motor 1 is a motor for assisting a torque to operate the steering wheel 3 in order for the driver to steer a vehicle and assists the driver to steer the vehicle more simply.

A reducer and a torque sensor (not shown) may be coupled to one end of the motor 1. The torque sensor generates an electric signal generated by detecting a relative rotational displacement of an input shaft and an output shaft according to rotation of the steering wheel 3 and transmits the electric signal to the ECU 6.

The steering angle sensor 5 is installed near the steering wheel 3 and directly measures a rotation angle of the steering wheel 3 which is rotated by an operation of the driver. In addition, the steering angle sensor 5 transmits a signal of the measured rotation angle to the ECU 6.

The ECU 6 may electronically control various driving sources of the EPS system including the motor 1 on the basis of information of a vehicle speed sensing sensor which is not shown, the torque sensor, and the steering angle sensor 5.

Here, the motor 1 may be connected to the steering shaft 5 of the EPS system 2.

Although the present invention has been described with reference to the embodiments thereof, it will be understood by those skilled in the art that the invention may be variously changed and modified without departing from the spirit and scope of the present invention appended in the following claims. In addition, it should be interpreted that the differences related to the change and modification fall within the range of the present invention defined by the appended claims.

| [Reference Numerals] | |
|---|---|
| 1: MOTOR | |
| 2: ELECTRONIC POWER STEERING SYSTEM | |
| 4: STEERING SHAFT | 20: BEARING |
| 100: COVER ASSEMBLY | 110: COVER BODY |
| 111: UPPER COVER | 112: LOWER COVER |
| 113: BEARING PLATE | 120: THROUGH HOLE |
| 130: GROMMET | 140: PROTRUSION |
| 200: HOUSING | 300: STATOR |
| 400: COIL | 500: ROTOR |
| 600: ROUTER | 610: ROUTER BODY |
| 620: GUIDE | 621: FIRST GUIDE |
| 622: SECOND GUIDE | 700: ROTATING SHAFT |

The invention claimed is:

1. A cover assembly comprising:
a cover body having a disc shape; and
a plurality of first holes formed in the cover body,
wherein the cover body includes
an upper cover,
a lower cover,
a bearing plate disposed between the upper cover and the lower cover, and
a first protrusion and a second protrusion which are formed to protrude from a lower surface of the lower cover, and
wherein the first protrusion is formed to have a predetermined curvature with respect to a center (C) of the cover body.

2. The cover assembly of claim 1, wherein:
at least two second protrusions are formed to extend from one side of the first protrusion; and
the second protrusions are disposed to be spaced apart from each other on the lower surface of the lower cover.

3. The cover assembly of claim 2, wherein one region of any one of the second protrusions is formed to have a predetermined curvature with respect to the center (C) of the cover body.

4. The cover assembly of claim 3, wherein the curvature of the second protrusion is greater than the curvature of the first protrusion.

5. A motor comprising:
a rotating shaft;
a rotor coupled to the rotating shaft;
a stator disposed outside the rotor;
a coil wound around the stator;
a router disposed on the stator;
a housing which accommodates the rotor, the stator, and the router and in which an opening is formed in one side of the housing; and
a cover assembly which covers the opening,
wherein the cover assembly includes a cover body having a disc shape and a plurality of first holes formed in the cover body,
wherein the cover body includes an upper cover, a lower cover, a bearing plate disposed between the upper cover and the lower cover, and a first protrusion and a second protrusion formed to protrude from a lower surface of the lower cover, and
wherein the first protrusion is formed to have a predetermined curvature with respect to a center (C) of the cover body.

6. The motor of claim 5, wherein the router includes:
a router body having a disc shape; and
a plurality of guides which are disposed on the router body and guide the coil.

7. The motor of claim 6, wherein a channel is formed between the guides disposed to be spaced apart from each other.

8. The motor of claim 7, wherein:
the guide includes a first guide and a second guide disposed at one side of the first guide; and
a height (h2) of the second guide is lower than a height (h1) of the first guide.

9. The motor of claim 8, wherein the first protrusion is disposed above the second guide.

10. The motor of claim 9, wherein the second protrusion is disposed in the channel.

11. The motor of claim 5, wherein:
at least two second protrusions are formed to extend from one side of the first protrusion; and
the second protrusions are disposed to be spaced apart from each other on the lower surface of the lower cover.

12. The motor of claim 11, wherein one region of any one of the second protrusions is formed to have a predetermined curvature with respect to the center (c) of the cover body.

13. A motor comprising:
a rotating shaft;
a rotor coupled to the rotating shaft;
a stator disposed outside the rotor;
a coil wound around the stator;
a router which is disposed on the stator and includes a plurality of guides;
a housing which accommodates the rotor, the stator, and the router and in which an opening is formed in one side of the housing; and
a cover assembly which covers the opening,
wherein the cover assembly includes a protrusion formed to protrude from a lower surface thereof, and the protrusion supports the coil disposed between the guides.

14. The motor of claim 13, wherein:
the protrusion includes a first protrusion and second protrusions;
the first protrusion is formed to have a predetermined curvature with respect to a center (C) of the cover assembly; and
the plurality of second protrusions formed to extend from one side of the first protrusion are disposed to be spaced apart from each other.

15. The motor of claim 14, wherein:
the guide includes a first guide and a second guide disposed at one side of the first guide; and
a height (h2) of the second guide is lower than a height (h1) of the first guide.

16. The motor of claim 15, wherein the second protrusion is disposed between the first guides.

17. The motor of claim 16, wherein the sum of a diameter (D) of the coil and a height (h3) of the second protrusion is equal to a height (h1) of the first guide.

18. The motor of claim 16, wherein a width between the first guides is greater than a width of the second protrusion.

19. The motor of claim 13, wherein the cover assembly includes:
   a cover body having a disc shape; and
   a plurality of first holes formed in the cover body,
   wherein a grommet is disposed on the first hole, and the grommet is formed to extend and protrude from an upper surface of the cover body.

20. The motor of claim 19, wherein the cover body includes:
   an upper cover;
   a lower cover; and
   a bearing plate disposed between the upper cover and the lower cover,
   wherein the grommet is disposed on the upper cover, and
   the upper cover, the lower cover, and the grommet are formed on the bearing plate of the cover body using an insert injection method.

* * * * *